July 26, 1927.
F. B. HAMBLIN
SCALE
Filed July 22, 1926
1,636,908
2 Sheets-Sheet 2
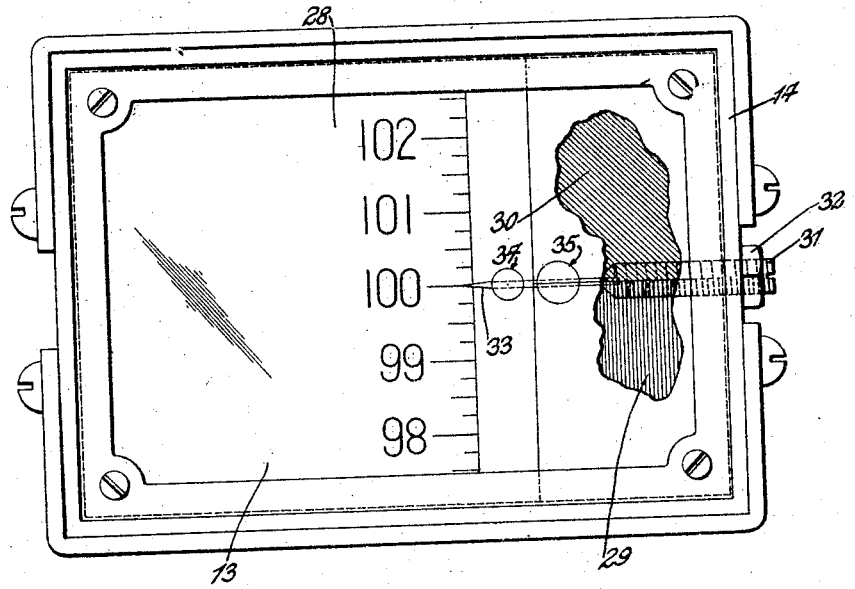
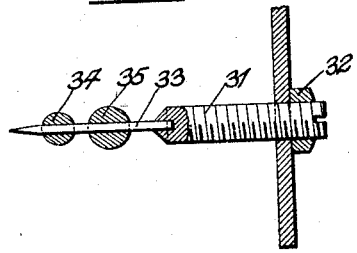
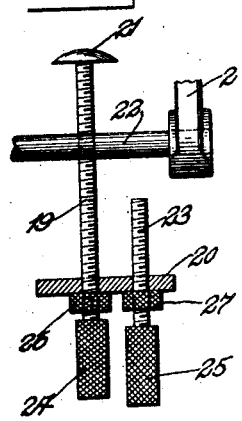
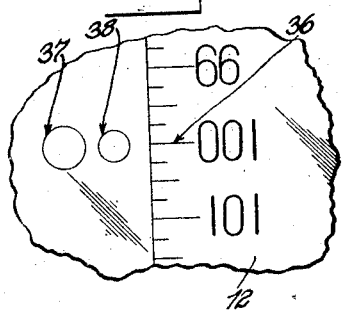
Inventor:
Fred B. Hamblin,
by Rippey + Kingsland
His Attorneys.

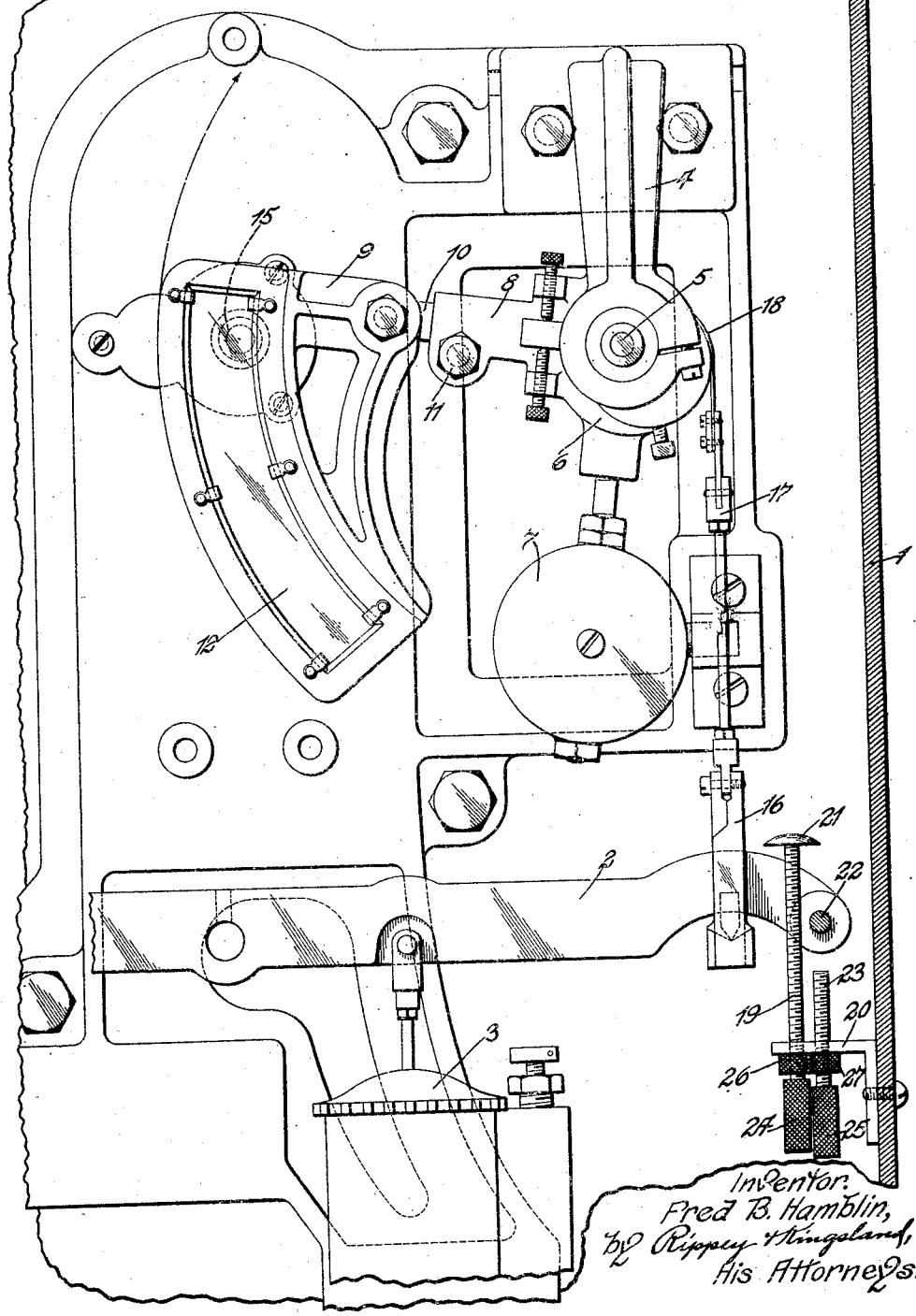

Patented July 26, 1927.

1,636,908

UNITED STATES PATENT OFFICE.

FRED B. HAMBLIN, OF ST. LOUIS, MISSOURI, ASSIGNOR TO THE WEIGHTOGRAPH COMPANY, OF ST. LOUIS, MISSOURI, A CORPORATION OF MISSOURI.

SCALE.

Application filed July 22, 1926. Serial No. 124,162.

This invention relates to improvements in scales and more particularly a scale adapted for weight duplication.

An object of the invention is to provide a scale with improved means for indicating over and under weight from a normal predetermined weight.

Another object of the invention is to provide a scale with an adjusting mechanism to hold the operation of the scale within a predetermined weight zone.

Additional advantages of the structure will be apparent from the following detailed description thereof, taken in connection with the accompanying drawings in which, Fig. 1 is a front view of the operating mechanism with the front plate of the scale housing removed.

Fig. 2 is a view of the screen frame upon which the scale chart is projected.

Fig. 3 is a detail view of the pointer device used in connection with the scale as a centering indicator.

Fig. 4 is a fragmentary view of the scale chart.

Fig. 5 is a view of the adjusting mechanism for determining the range of throw of the scale beam.

In the embodiment of the invention illustrated in the drawing, the scale is shown as including a scale housing 1. Within the housing and pivoted for rocking movement is the main scale beam 2, the action of which is controlled by a dash pot 3.

Hangers 4 suitably connected with the scale housing provide means for supporting a shaft 5 upon which an eccentric hub 6 is mounted and a pendulum 7 is connected to the hub 6. Extending laterally from the hub 6 is an arm 8 that adjustably supports a chart frame 9, the chart frame 9 having a cylindrical extension 10 that fits into an opening in the end of the arm 8 with which it is frictionally connected by a clamped nut 11 for centering the chart and holding it in its proper adjustment.

A chart 12 is removably supported in the chart holder or frame 9 and the indicia on the chart are magnified and projected onto a ground glass panel 13 carried in a spring frame 14 which is a part of the front plate of the scale housing. It will be understood that the chart indicia are projected to the screen by a lens system, the condensing lens being shown in Fig. 1 of the drawing in dotted lines 15, the projecting lens being in a plane forward of the chart and between the chart and the panel 13.

The oscillating movement of the scale beam 2 induced by the weight is translated to an arcuate movement of the chart by means of a connection comprising a stirrup 16, a rod 17 and a flexible band 18 operating over the face of the eccentric hub 6.

The structure of the scale thus far described comprises known subject matter and is not a part of the present invention. The present invention has to do with the limitation of the extent of movement of the main scale beam 2 to hold it within a predetermined weight zone and also to the means of projecting distinctive indications for determining over and underweight from a predetermined weight indication.

The means for determining the extent of oscillation of the main scale beam 2 comprises a screw 19 supported by a bracket 20 projecting inwardly from a side wall of the scale housing, which screw is provided with an abutment or head 21 in a plane above a rod 22 that extends at right angles from the outer extremity of the scale beam and another screw 23, the end of which is below the abutment 22. The abutment 22, in the embodiment illustrated, comprises a connection with a tare beam (not shown) but it will be understood that any form of abutment connected to the main beam may be utilized.

The screws 19 and 23 are provided with knurled ends 24 and 25 respectively and jam-nuts 26 and 27. By adjusting the interval between the top face of the screw 23 and the underface of the head 21, the range of movement of the scale beam may be determined, thus holding the movement of the scale beam that results in a movement of the scale chart within a predetermined range.

The screen upon which the chart is projected comprises one section 28 of ground glass or other translucent material for receiving the image of the chart projected thereto. At one side of the scale in vertical alinement are two distinctive screen sections 29 and 30 composed of vari-colored glass so as to provide distinctive display zones for the over and underweight indications.

Back of the panels 29 and 30 and extending over the adjacent marginal edge of the panel 28 is an adjustable indicating pointer comprising a threaded shank 31 that projects through the side wall of the scale housing, said shank being adjustable longitudinally by reason of its threaded engagement with the opening through which it projects. A jam-nut 32 is provided on the outer extremity of the shank to lock the shank in proper adjustment.

Extending inwardly from the inner end of the shank is a rod 33 having its inner extremity pointed to form an indicating arrow for cooperating with the scale chart to afford a scale reading. The rod 33 carries two discs or spherical members 34 and 35, the member 34 being of a slightly less diameter than the diameter of the member 35.

The scale chart is provided with indicia comprising a weight indicating scale 36 arranged in vertical sequence, and at predetermined points on the scale are provided openings or windows 37 and 38 through which beams of light in alinement with the predetermined scale line are projected toward the screen. In centering the indicator, the member 35 is arranged within the marginal edge of the vertical panels 29 and 30 and the member 34 is arranged within the area of the screen panel 28 adjacent to the line between the distinctive panels and the said panel 28.

When the beams of light passing through the openings 37 and 38 in the scale chart and the end of the pointer centers at the predetermined scale line, the members 34 and 35 mask the light rays and prevent any indication reaching the screen. Whenever the chart varies from the predetermined weight either by an over or under movement, the unmasked portion of the beams will throw a ray over or under the members 34 and 35, which rays illuminate an area either in the underweight panel 29 or the overweight panel 30 and also in the marginal area of the panel 28 adjacent to the area upon which the scale chart is projected. It is thus possible for the operator to receive an indication of a slight variation from the normal weight and to determine the exact extent of the over or underweight by the position of the shadow cast by the member 34 and the end of the pointer and to receive a distinctive indication by the illumination of an area in the vari-colored panels 29 and 30.

The scale may, therefore, be used for rapid duplicating work for multiple weighings of predetermined weights. It will be understood that the adjustment may be made so that the range within predetermined weight zones may be accomplished.

It is thus seen that the construction disclosed actually accomplishes the stated objects and purposes and that it has a wide range for duplicating weighing operations. It will also be observed that by releasing the means for limiting the movement of the scale beam, the scale may be used on straight weighing operations within the full range of the capacity of the scale.

I am aware that the invention may be modified in various particulars without departing from the spirit and scope thereof, but what I claim and desire to secure by Letters Patent is:

1. In a scale, the combination with a weighing mechanism, of a screen having a scale image receiving zone and distinctively marked zones to indicate over and underweight, a chart having scale indications, means coordinated with the scale indications for displaying an indication in the over and underweight zones of the screen, and a pointer device located between the chart and the screen for centering the scale on the chart and for cooperating with the means on the chart for indicating the over and underweight operations of the chart.

2. In a scale, the combination with weighing mechanism, of a screen having over and underweight zones, a chart responsive to loads and having openings for projected rays of light, means for projecting the chart on the screen, and a pointer device located between the chart and the screen arranged to obstruct light rays through said openings to give a normal indication when the pointer centers with a predetermined scale indication of the chart.

3. In a scale, the combination of weighing mechanism, a screen, a chart having distinctive over and underweight zones, means for projecting the chart on the screen and for causing a direct ray in alinement with the distinctive zones, and a pointer located between the chart and the screen for masking the light rays projected from the chart and to center the direct ray to give a neutral indication when a load moves the chart to a predetermined position and to permit said direct ray to be projected into one or the other of said distinctive zones when the normal position of the chart is moved therefrom in either direction.

4. In a scale, the combination with weighing mechanism, of a screen, a chart having a weight scale thereon and an opening therethrough in alinement with a predetermined scale line, a device intermediate the chart and the screen obstructing said opening and centering a normal scale line and permitting a direct ray to pass through said opening into either one or the other of said distinctive zones when the normal weight is exceeded or diminished.

5. In a scale, the combination with a weighing mechanism, of a screen having a scale image receiving zone and distinctively marked zones to indicate over and underweight, a chart having scale indications, means coordinated with the scale indications for displaying an indication in the over and underweight zones of the screen, a pointer device located between the chart and the screen for centering the scale on the chart and for cooperating with the means on the chart for indicating the over and underweight operations of the chart, and adjustable means for limiting the extent of movement of the weighing mechanism.

6. In a scale, the combination with weighing mechanism, of a screen having over and underweight zones, a chart responsive to loads and having openings for projected rays of light, means for projecting the chart on the screen, a pointer device located between the chart and the screen arranged to obstruct light rays through said openings to give a normal indication when the pointer centers with a predetermined scale indication of the chart, and adjustable means for limiting the extent of movement of the weighing mechanism.

7. In a scale, the combination of weighing mechanism, a screen, a chart having distinctive over and underweight zones, means for projecting the chart on the screen and for causing a direct ray in alinement with the distinctive zones, a pointer located between the chart and the screen for masking the light rays projected from the chart and to center the direct ray to give a neutral indication when a load moves the chart to a predetermined position and to permit said direct ray to be projected into one or the other of said distinctive zones when the normal position of the chart is moved therefrom in either direction, and adjustable means for limiting the extent of movement of the weighing mechanism.

8. In a scale, the combination with weighing mechanism, of a screen, a chart having a weight scale thereon and an opening therethrough in alinement with a predetermined scale line, a device intermediate the chart and the screen for centering a normal scale line and for permitting a direct ray to pass through said opening into either one or the other of said distinctive zones when the normal weight is exceeded or diminished, and adjustable means for limiting the extent of movement of the weighing mechanism.

FRED B. HAMBLIN.